Sept. 29, 1931.  R. L. STOUT  1,824,845
TRAILER BRAKE OPERATING MECHANISM
Filed Sept. 21, 1927
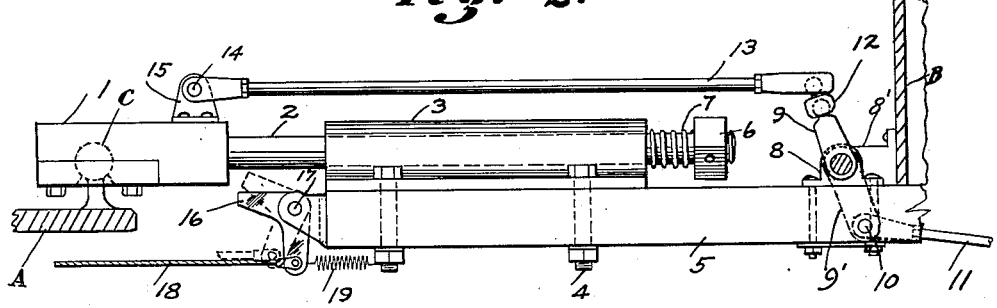
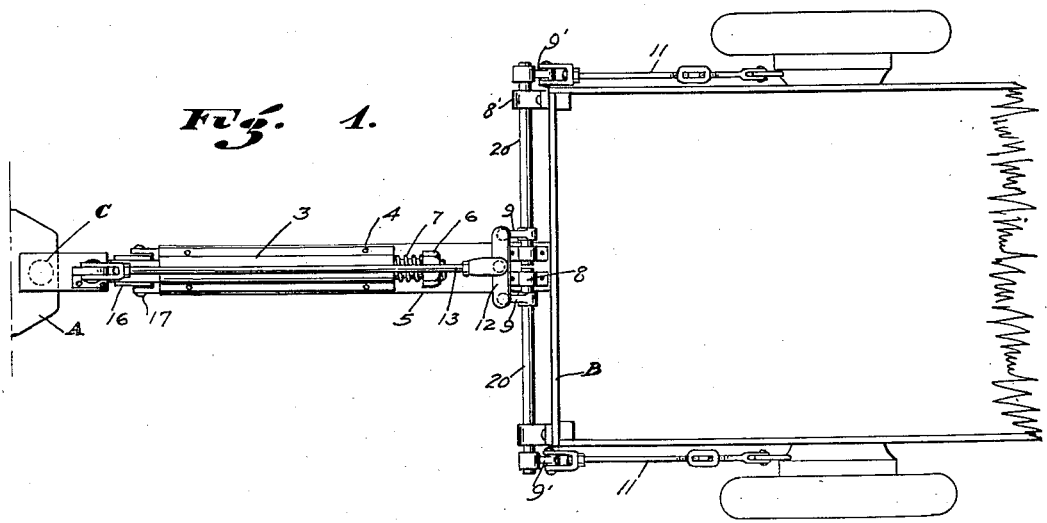
INVENTOR.
Roy L. Stout.
BY Miller & Boyken
ATTORNEY.

Patented Sept. 29, 1931

1,824,845

UNITED STATES PATENT OFFICE

ROY L. STOUT, OF OAKLAND, CALIFORNIA

TRAILER BRAKE OPERATING MECHANISM

Application filed September 21, 1927. Serial No. 220,877.

This invention relates to a means for operating the brakes of a trailer, or any vehicle being pulled by another in tandem relation.

The objects of the invention are to provide brake operating mechanism which will apply the brakes to the trailer upon the speed of the leading vehicle being arrested by its brakes or any other cause, or by any lurching forward of the trailing vehicle.

Another object is to provide such a mechanism which will be entirely automatic in its action in applying and releasing the trailer brakes without attention from the driver of the leading or pulling vehicle.

Another object is to provide such a mechanism which will dispense with any operative connection to the brake system of the leading vehicle, but will automatically operate in response to any braking of the leading vehicle, or release of such braking.

Still another object is to provide means in such a mechanism whereby the driver of the leading vehicle can at will render the braking feature of the trailer inoperative so that the vehicles may be backed up. Finally, another object is simplified mounting of such mechanism.

Briefly described my invention consists in equipping the trailer with brakes and of connecting the trailer to the pulling vehicle by means of linkage in such a manner that upon braking the leading vehicle, the momentum of the trailing vehicle will operate the linkage and set the trailer brakes, and conversely upon release of the brakes of the leading vehicle and its consequent sudden increase of speed the inertia of the trailing vehicle will operate the linkage reversely to release the trailer brakes. Such application and release of the trailer brakes being instantly responsive to all relative forward or backward movements of the leading vehicle and in proportion to the suddenness of such movements.

In the drawings Fig. 1 is a plan view of my complete mechanism arranged to connect the rear end A of an automobile or other pulling vehicle with a trailer B.

Fig. 2 is an enlarged side elevation of the operating mechanism, no details of the pulling vehicle or trailer being given, as the invented control mechanism may be applied to any kind of a wheeled vehicle pulling another, such as wagons, trucks, automobiles, locomotives pulling cars, or to any number of such wheeled vehicles when operated in tandem relation.

In the drawings A is a part of the frame or a pulling lug fastened to or extending from the rear end of the pulling automobile or other leading road vehicle. B is the forward end of the vehicle being pulled, in this case a two-wheeled trailer of well known type, a broken away forward portion only being shown in Fig. 1 and mostly omitted in Fig. 2. At 1 is a draw-bar secured preferably by a ball and socket or universal joint as at C to the lug or frame A projecting rearwardly from the pulling vehicle, 2 is a reduced portion or shaft extending from the draw-bar 1 and slidable within a sleeve 3 secured by bolts 4 to the forwardly projecting tongue 5 of the trailer B or vehicle being pulled.

Sliding shaft 2 is preferably round so as to obviate binding through twisting action of the vehicles, and it is provided with a head or nut 6 to take the pull, said nut preferably acting against a resilient bumper such as a heavy piece of rubber or the spiral spring 7.

Pivotally supported in bearings 8 on the tongue and 8' at the forward end of the trailer are duplicate shafts 20, which are provided on their confronting ends with upwardly extending cranks 9· and at their outer ends with downwardly extending cranks 9' pivoted at 10 to brake pull rods 11 leading to the brakes of the trailer for operating the same.

Connecting the upper ends of cranks 9 by means of ball pivots indicated, is an equalizer bar 12 in turn similarly pivoted to a thrust rod 13 which is pivoted at its forward end at 14 to a bracket 15 secured to the draw-bar, the arrangement being such that a rearward sliding movement of the draw-bar relative to the sleeve 3 will force the rod 13 rearward and rock the cranks 9 through the equalizer to thereby pull the trailer brake rods 11.

Thus with both vehicles in motion, any arresting of the speed of the pulling vehicle, as by application of its brakes will at once (through continued forward movement of the trailer) cause a relative backward movement of the thrust rod and application of the trailer brakes, also any sudden lurching forward of the trailer will produce the same effect, so that in case the trailer were heavily loaded and coming down a steep incline it would not push against the leading vehicle but would set its own brakes to the degree required.

Upon release of the pulling vehicle's brakes or increased speed forward the shaft 2 is slid forwardly relative to the sleeve 3 and reverses the action described, thus releasing the tension on the brake rod 11 and consequently releasing the trailer brakes.

In order to permit backing of the pulling vehicle and trailer without applying the trailer brakes, I provide a latch 16 pivoted at 17 to the forward end of the trailer tongue 5 and provided with a cable 18 or other device extending forwardly to the driver's compartment of the leading vehicle and there arranged in any convenient manner (not shown) for pulling by the driver to throw the latch to dotted position in the path of travel of the draw-bar and thereby form an obstruction to the rearward sliding thereof relative to the sleeve, thus locking the parts against operating to apply the trailer brakes and permitting free backing of the vehicles until the latch is released.

A tension spring 19 serves to aid in quickly returning the latch out of engagement with the draw-bar upon releasing the pull on cable 18.

It will be evident from the foregoing description that my automatic brake operating mechanism may be applied to any style of drawn vehicle equipped with a brake, or between any number of such vehicles arranged in tandem, also it should be noted that while I show as my preferred construction the use of equalizing cranks 9 to apply the power of the thrust rod 13 and produce a pull upon the brake rods 11, various modifications may be resorted to for leading the power to the brakes or the rod 13 or its equivalent may be used direct, and any such modifications coming within the spirit of the invention are sought to be covered in the appended claims.

I claim:

1. In a brake operating mechanism, a draw-bar adapted for extension from a vehicle and provided with a round shank, a tongue adapted for extension from a second vehicle and rigidly secured thereto and provided with a socket slidably engaging said shank, said shank provided with means limiting its slidable movement in said socket and providing a load pulling member, a brake actuating device for said second vehicle extending adjacent said tongue, a crank lever pivotally mounted on said tongue connected from one end to said device for operating the same, and a thrust rod extending past said socket and pivotally connecting the other end of said arm to said draw-bar, whereby a sliding of said draw-bar in said socket will operate said rocker arm and said brake actuating device.

2. In a brake mechanism for operating the brakes of a trailer vehicle, a draw-bar adapted for extension from a pulling vehicle, a tongue secured to and extending from the trailer, a sleeve secured to said tongue slidably engaging said draw-bar to permit longitudinal movement thereof, means limiting the movement of said draw-bar in said sleeve and providing a load pulling member, a pair of individual shafts rotatably mounted on the forward end of said trailer and extending respectively outward from said tongue, cranks on the outer ends of the shafts, rods connected at an end each to said cranks respectively and connected each at opposite ends to each of the trailer brakes for operating the same cranks on the inner ends of the shafts, and means pivotally connecting the ends of the inner cranks with a fixed point on said draw-bar.

3. In a structure as specified in claim 2 said last mentioned means including an equalizer bar pivoted at opposite ends to the cranks and a thrust rod pivoted at one end to the equalizer bar and at its other end to the draw-bar.

ROY L. STOUT.